United States Patent [19]
McComb et al.

[11] Patent Number: 6,111,573
[45] Date of Patent: Aug. 29, 2000

[54] DEVICE INDEPENDENT WINDOW AND VIEW SYSTEM

[75] Inventors: David W. McComb; James L. Long; Mike Stephenson, all of Fort Collins, Colo.

[73] Assignee: Velocity.com, Inc., San Francisco, Calif.

[21] Appl. No.: 09/023,364

[22] Filed: Feb. 13, 1998

Related U.S. Application Data

[60] Provisional application No. 60/038,387, Feb. 14, 1997, provisional application No. 60/037,941, Feb. 14, 1997, and provisional application No. 60/038,390, Feb. 14, 1997.

[51] Int. Cl.[7] .............................. G06F 3/14; G06F 15/00
[52] U.S. Cl. ............................ 345/334; 345/339; 345/439
[58] Field of Search ........................ 345/332, 340, 345/341, 342, 343, 347, 329, 352, 353, 327, 328, 330, 331, 334, 333, 335, 439, 339; 709/219

[56] References Cited

U.S. PATENT DOCUMENTS

| | | |
|---|---|---|
| 4,831,556 | 5/1989 | Oono ........................................ 345/341 |
| 5,465,362 | 11/1995 | Orton et al. . |
| 5,477,241 | 12/1995 | Higgins et al. ........................ 345/127 |
| 5,522,025 | 5/1996 | Rosenstein . |
| 5,544,301 | 8/1996 | Orton et al. . |
| 5,555,368 | 9/1996 | Orton et al. . |
| 5,634,064 | 5/1997 | Warnock et al. ........................ 345/341 |
| 5,649,216 | 7/1997 | Sieber ..................................... 707/506 |
| 5,668,960 | 9/1997 | Kataoka .................................. 345/333 |
| 5,670,984 | 9/1997 | Robertson et al. ..................... 345/139 |
| 5,694,561 | 12/1997 | Malamud ................................ 345/342 |
| 5,790,094 | 8/1998 | Tanigawa et al. ...................... 345/115 |
| 5,864,332 | 1/1999 | Young ..................................... 345/127 |
| 5,889,519 | 3/1999 | Boezeman et al. ..................... 345/340 |
| 5,898,431 | 4/1999 | Webster .................................. 345/331 |

*Primary Examiner*—Raymond J. Bayerl
*Assistant Examiner*—Thomas Joseph
*Attorney, Agent, or Firm*—Stuart T. Langley; Hogan & Hartson L.L.P.

[57] ABSTRACT

An apparatus and method for operating a graphic user interface in a windowing operating system. A value representing a mapping of logical inches to real measurement units is determined from information stored in the operating system. A physical size in real measurement units of a display device is determined. A user viewing the display device is asked to identify a displayed graphic image having a preselected dimension in real measurement units. A plurality of graphic objects are displayed, where each of the graphic objects have a different size. The user viewing the plurality of graphic object is asked to select one of the graphic objects. The size of the selected graphic object is saved as a first user-defined size.

3 Claims, 9 Drawing Sheets

DEVICE INDEPENDENT WINDOW AND VIEW SYSTEM

The present invention relates to and claims priority from U.S. Provisional application Ser. No. 60/038,387 entitled "SOFTWARE APPLICATIONS AS DATA" filed on Feb. 14, 1997, U.S. Provisional Application Ser. No. 60/037,941 entitled "CRUCIBLE QUERY SYSTEM" filed on Feb. 14, 1997, and U.S. Provisional Application Ser. No. 60/038,390 entitled "DEVICE INDEPENDENT WINDOW LAYOUT FOR GRAPHICAL DISPLAY OF INFORMATION" filed on Feb. 14, 1997.

BACKGROUND OF THE INVENTION

1. Field of the Invention

The present invention relates to patented U.S. patent application Ser. No. 09/023,036 entitled "ORGANICWARE APPLICATIONS FOR COMPUTER SYSTEMS" and patented U.S. patent application Ser. No. 09/023,167 entitled "CRUCIBLE QUERY SYSTEM", all assigned to the assignee of the present invention, filed concurrently herewith, the teachings of which are incorporated herein by reference in their entirety.

2. Relevant Background

Computer pictures or images drawn on a computer screen are called computer graphics. Computer graphic systems store graphics internally in digital form. The picture is broken up into tiny picture elements or pixels. Thus, a computer picture or graphic is actually an aggregation of individual picture elements or pixels. Graphic processing for display of information is a critical problem for presenting information in an efficient, ergonomic manner.

Conventional computer graphic systems use image primitives known as images, bitmaps, or pixel maps to represent computer imagery as an aggregation of pixels. These primitives represent a two-dimensional array of pixel attributes and their respective digital values. Typically, such a primitive is expressed as a "struct" which is a data structure that contains a pointer to pixel data, a pixel size, scan line size, bounds, and optionally a reference to a color table. These primitives serve as a frame buffer and as a frame storage specification.

Current graphical display systems have a hardware component and a software component. The hardware component comprises a display such a cathode ray tube (CRT) and a display adapter that drives signals (e.g. RGB signals) to the display. A wide variety of displays are available that vary in size, resolution, color depth, and readability. Users choose a particular display to meet particular application criteria such as cost, size, and effectiveness. Although the present invention does not directly modify the hardware component of a graphic display system, it is important to note that an effective windowing and viewing system (i.e., the software component) should be readily adaptable to display information effectively and ergonomically on any of a wide variety of display devices. This is particularly true in distributed application and distributed data base applications in which users may wish to access the application or data base from any of a wide variety of display devices. Until now, it has been extremely complex to develop a distributed application that could efficiently service this wide variety of display devices.

Current windowing systems create a window for every running application that needs to communicate to a user through the graphical interface. A particular application may have more than one window in some instances. The user interface portion of the operating system (e.g., windows, OS/2, UNIX) may also generate windows directly to communicate through the graphical user interface. Within each window, a number of views are defined. Each view is directed towards a specific task being completed by the application. For example, a word processing application may have a main view that provides a representation of a document and the number of tools that can be used to edit the document. Another view might be a dialog box used to communicate information to a user. These views are established within the application and may overlap each other as needed.

It is known to enable views to change their appearance based on certain states of the application or machine. An active view, for example, may be colored differently than an inactive view which may appear dimmed. While these changes known in the prior art do convey information to the user, they do not effect the content or component objects that make up a view. Each view is filled with one or more component objects. These component graphical objects each comprise data or state information together with methods (i.e., executable instructions) that enable the data to be displayed in a desired format.

One of the most important aspects of a modern computing system is the interface between the human user and the machine. The earliest and most popular type of interface was text based. In these systems, the user communicated with the machine by typing text characters on a keyboard and the machine communicated with the user by displaying text characters on a display screen. Such interfaces are also referred to as command line interfaces. More recently, graphic user interfaces have become popular whereby the machine communicates with the user by displaying a combination of text and graphics on a display screen and the user communicates with the machine both by typing text commands and manipulating the displayed pictures with a pointing device such as a mouse.

A typical graphic user interface is called a window environment. Examples include Microsoft Windows, IBM OS/2 and X Windows running on a UNIX operating system. In a typical window environment, the graphic display portrayed on the display screen is arranged to resemble the surface of an electronic desktop and each application program running on the computer is represented as one or more electronic windows displayed in rectangular regions of the screen.

Each window region generally displays information that is generated by the associated application program. There may be several window regions simultaneously displayed on the desktop each representing information generated by a different application. An application presents information to the user through each window by drawing or painting images, a graphic and text within the window region. The user communicates with the application by pointing at objects in the window region with a cursor which is controlled by a pointing device and manipulating or moving the objects. The window regions may also be moved around on the display screen and changed in size and appearance so that the user can arrange the display in a convenient manner.

Each window region typically includes a number of graphical objects or components such as sizing boxes, buttons and scroll bars. These features represent user interface devices that the user can point at with a cursor to select and manipulate. When the devices are selected or manipulated, the underlying application program is informed via the graphic interface that the control has been manipulated by the user.

In general, the window environment is supported by or part of an operating system running on the computer. The operating system provides an interface to application (i.e., an application programmer's interface) that allows the application to pass messages to the operating system that enable the operating system to manipulate the display, and return messages from user I/O components such as a mouse or keyboard to the application. The application program interacts with the operating system to provide a higher level of functionality and perform a specific task. The application program typically makes use of the operating system functions by sending out a series of task commands or system calls.

The method of handling screen displays varies from computer to computer and can affect how a particular window or view is displayed from one computer system to another. Many windowing systems use a technique called "logical inches" to convert physical measurements to display area. This technique is an outgrowth of desktop publishing. A display is not capable of the resolution of paper. Hence, a display image is usually magnified as compared to the paper image that will be printed. While this is very effective for desktop publishing, it is an impediment when designing graphical interfaces that are not intended to be printed. Although windowing systems allow a user or application to change the logical inch to be equal to a real inch, this changes the magnification every feature of the graphical interface. With such a modification, the application may be able to specify a window with a specific dimension in real measurement units, but associated text in buttons and control will be altered so that it may become unreadable. Alternatively, the display units are arbitrary, having no predetermined or set relationship to a real unit of measure. This often results where the hardware graphics adapter or monitor allow scaling of which the operating system is not aware.

SUMMARY OF THE INVENTION

Briefly stated, the present invention involves an apparatus and method for operating a graphic user interface in a windowing operating system. A value representing a mapping of logical inches to real measurement units is determined from information stored in the operating system. A physical size in real measurement units of a display device is determined. A user viewing the display device is asked to identify a displayed graphic image having a preselected dimension in real measurement units. A plurality of graphic objects are displayed, where each of the graphic objects have a different size. The user viewing the plurality of graphic object is asked to select one of the graphic objects. The size of the selected graphic object is saved as a first user-defined size.

DETAILED DESCRIPTION OF THE PREFERRED EMBODIMENTS

In general, the present invention involves a graphic information display system and method particularly adapted to computing environments where a wide variety of display hardware is used. The approach in accordance with the present invention comprises four interacting primary components: 1) real and consistent units of measurement used to describe the information to be displayed; 2) unit independent sizing; 3) dynamic sizing of images; and 4) dynamic layout of images within a view.

Figure 1:
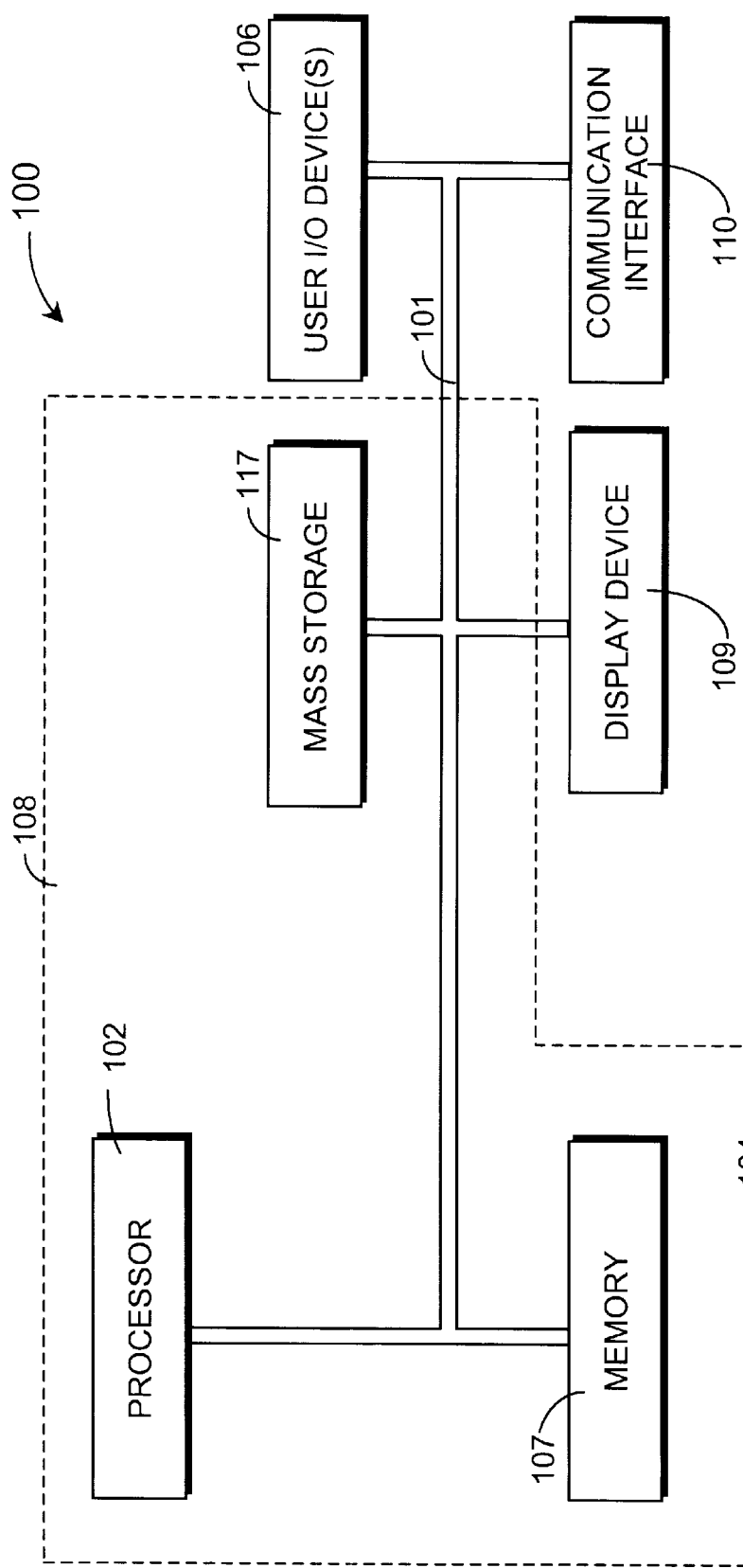
FIG. 1 shows in block diagram form basic components of a computer system implementing the present invention.

FIG. 1 illustrates in block diagram form a computer system incorporating an apparatus and system in accordance with the present invention. Processor architectures and computing systems are usefully represented as a collection of interacting functional units as shown in FIG. 1. These functional units, discussed in greater detail below, perform the functions of fetching instructions and data from memory, processing fetched instructions, managing memory transactions, interfacing with external I/O and displaying information.

The present invention is described in terms of an apparatus and method particularly useful in a distributed computer system comprising multiple computer systems such as shown in FIG. 1. The particular examples represent implementations useful in a number of alternative processor architectures and operating system platforms. Accordingly, these alternative embodiments are equivalent to the particular embodiments shown and described herein. FIG. 1 shows a typical general purpose computer system 100 incorporating a processor 102 and using both an application program and an operating system executing in processor 102. The computer system is schematically represented by dotted line box 108. Computer System 100 in accordance with the present invention comprises an address/data bus 101 for communicating information, processor 102 coupled with bus 101 through input/output (I/O) devices 106 for processing data and executing instructions, and memory system 104, coupled with bus 101 for storing information and instructions for processor 102. Memory system 104 comprises, for example, one or more levels of cache memory and main memory in memory unit 107.

User I/O devices 106 are coupled to bus 101 and are operative to communicate information in appropriately structured form to and from the other parts of computer 100. User I/O devices may include a keyboard, mouse, magnetic or tape reader, optical disk, or other available I/O devices, including another computer. Mass storage device 117 is coupled to bus 101 and may be implemented using one or more magnetic hard disks, magnetic tapes, CD ROMs, large banks of random access memory, or the like. A wide variety of random access and read-only memory technologies are available and are equivalent for purposes of the present invention. Mass storage 117 includes computer programs and data stored therein. Some or all of mass storage 117 may be configured to be incorporated as part of memory system 104.

Display device 109 comprises hardware coupled to system bus 101 that is responsible for displaying information and graphics. Display device 109 may comprise a graphics adapter that drives a display such as a CRT, LCD or the like. In a typical configuration, display device 109 may allow the user to adjust certain settings such as magnification, but does not inform the operating system of such adjustments. Hence, display device 109 complicates the task of enabling an application to control precisely how information and graphics are displayed to a user.

Figure 2:
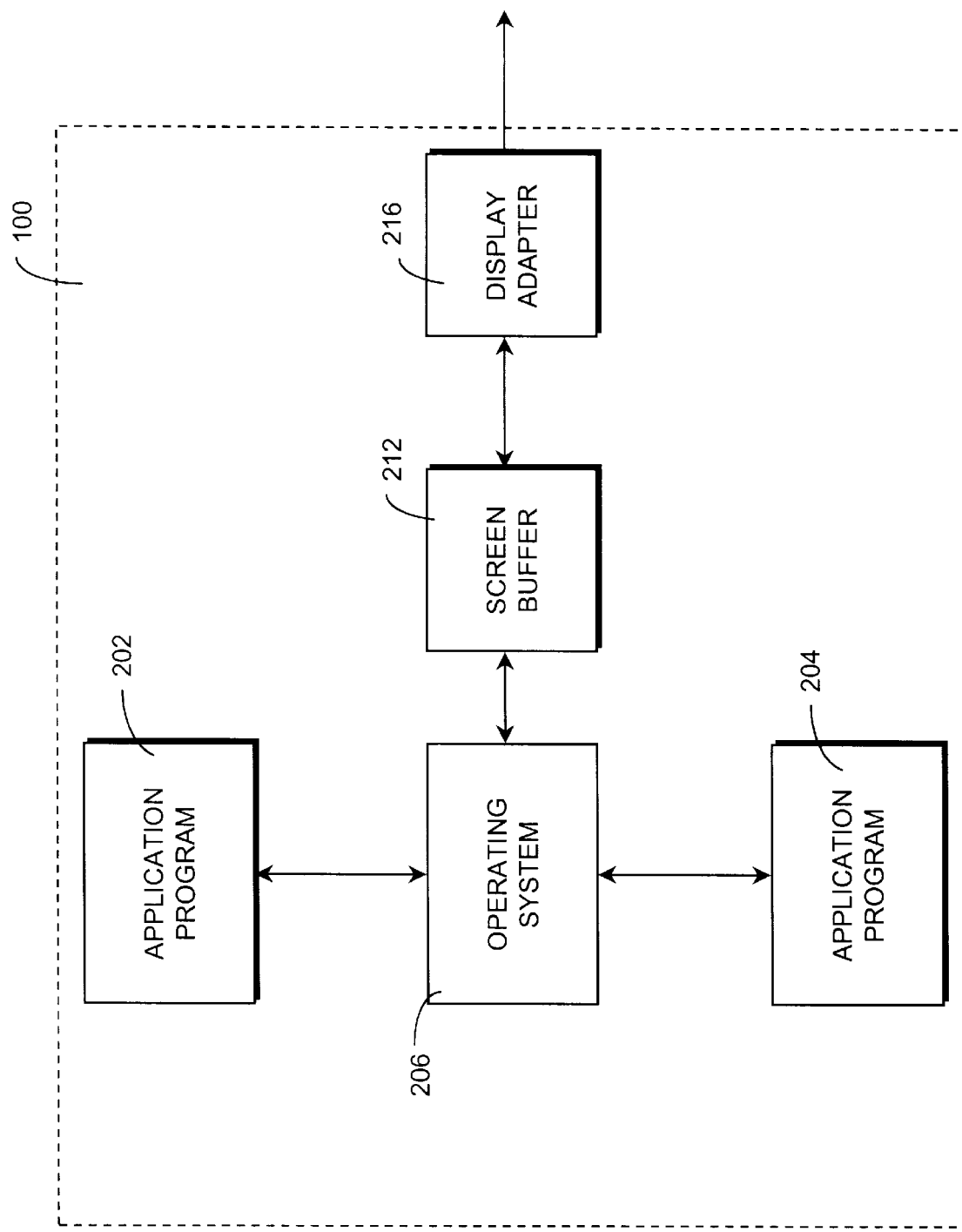
FIG. 2 shows in block diagram form elements of a windowing system useful in the implementation of the present invention.

FIG. 2 is a schematic illustration of a portion of typical computer 100 (also shown in FIG. 1) system implementing a display system 200 using both application program 202, application program 204, and an operating system 206 to implement a windowing graphic display system. The previously described interaction between application programs 202 and 204 and operating system 206 is illustrated schematically by arrows.

The method for handling screen displays varies from computer to computer somewhat. In order to provide screen displays, application programs 202 and 204 generally stores information to be displayed into a screen buffer 212. Under control of various hardware and software in the system the contents of screen buffer 212 are read out and provided, to a display adapter 216 within display device 109 (shown in FIG. 1). Display adapter 216 contains hardware and software, usually in the form of firmware, which converts the information within screen buffer 212 to a form that can be used to drive a display.

The configuration shown in FIG. 1 and FIG. 2 usually works well so long as a single hardware display device is used and that display device is not changed often. When the display device is changed often, or different client computers with different display devices access a common centrally stored application 202, 204, the applications 202 and 204 must adapt their output to meet the needs of the particular display device. These adaptations may include font changes, dialog box and window size changes, color changes, and the like. Most applications simply do not provide sufficient functionality resulting in poor or illegible displays that must be manually resized by the user.

In accordance with the present invention, window and view objects use real and consistent measuring units as actual units of measure. For example, an inch or fraction of an inch. By "real", it is meant that the unit of measure has an exact counterpart in conventional space measurement systems. This allows the size and position information to serve as a consistent reference from device-to-device regardless of the particular size or resolution of the display device. While device independence is, now, taken for granted when using a printer (i.e., a printed page will look substantially the same regardless of the printer generating it), this is because printers all output to the same page size (e.g., 8½×11 inch paper). With display devices there are several factors which need to be taken into account: physical size, resolution, and number of colors.

The system in accordance with the present invention determines a mapping from real units (such as a fraction of an inch) to display units (i.e., pixels per square inch) through information made available by the operating system 206 and by asking the user who is viewing the displayed information. The information obtained from operating system 206 is retrieved in a conventional manner. Program code suitable to obtain this information from a Windows 95 or Windows NT operating system is presented below:

```
// screen size in pixels
    int iHRes = GetDeviceCaps(hdc, HORZRES);
    int iVRes = GetDeviceCaps(hdc, VERTRES);
    // pixels per logical inch
    int iHpixelsPerIn = GetDeviceCaps(hdc, LOGPIXELSX);
    int iVpixelsPerIn = GetDeviceCaps(hdc, LOGPIXELSY);
    int twipsPerIn = 1440;
    int iHTwipsPerPixel = twipsPerIn / iHPixelsPerIn;
    int ivTwipsPerPixel = twipsPerIn / ivPixelsPerIn;
    // conversion factors
    int twipsPerMm = 57;
    // screen size in twips
    iHSize = iHSize * twipsPerMm;
    iVSize = iVSize * twipsPerMm;
    // pixel size in twips (NOTE: these live in GDIB)
    _dDisplayTWIPsPerXDev = iHSize / iHRes;
    _dDisplayTWIPsPerYDev = iVSize / iVRes;
```

The above code example extracts horizontal and vertical resolution information stored in the operating system. The operating system is also queried for the number of pixels in a logical inch (e.g., 96 for standard VGA display). The number of pixels per inch is an indication of the magnification being applied by the windowing system. However, this information often does not accurately reflect the actual display parameters because the display adapter 216 and even the display itself may apply scaling themselves that the operating system is not aware of.

However, this information is the most that can be retrieved from, for example, a Microsoft Windows 95 operating system and is used to calculate a real measurement unit (called a TWIP in the program code above) that is equal to $\frac{1}{1440}$ of an inch. This is merely an example, and any real measurement unit may be used. Applications in accordance with the present invention represent graphic object dimensions in terms of the TWIP real measurement unit. Dialog boxes, windows, and control graphics can all be described in TWIP units.

Unit-independent sizing is the selection of size not based on units. For example, a "small font" is identified rather than specific "6-point font". The small font has a user defined size in real units that ensures that the size is selected to meet the user's needs on a particular display. This technique is used in accordance with the present invention primarily for selecting fonts. This technique may also be used for control graphics such as icons.

The size, either in display units (i.e., pixels) or in physical units (i.e., fractions of an inch) of a readable font varies widely from display-to-display. In other words, an 8-point font may be readable on one display having high resolution, but not on another display. Readability is primarily a function of the size of the display's pixel, but not entirely. By allowing the user to specify fonts as small, medium, large or some other classification, the system is able to determine a display device specific legible font-size.

Figure 3:
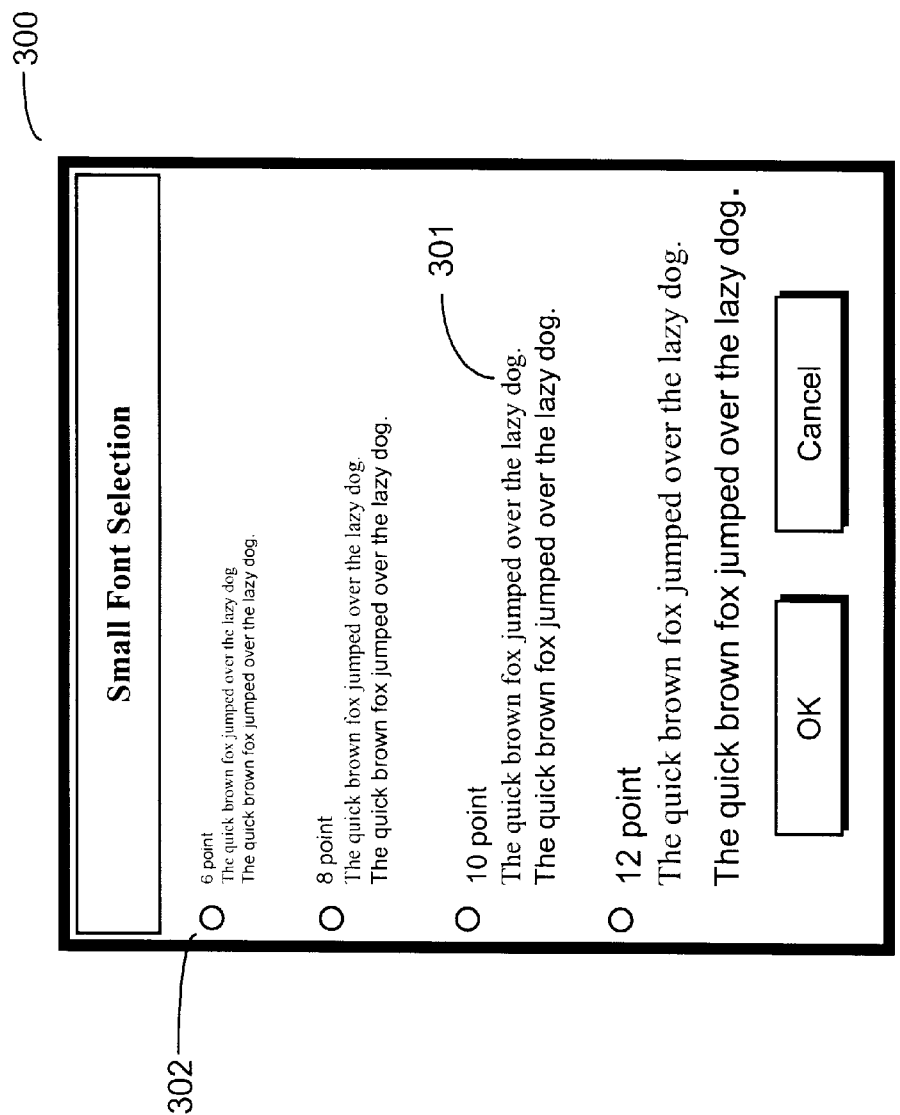
FIG. 3 illustrates a sample dialog query used in the present invention.

FIG. 3 shows a typical dialog used to obtain user-specified sizing. A dialog box 300 is displayed offering the user several choices 301 for a "small font". The choices are desirably displayed with a sample of text in the chosen font sufficient to enable the user to decide if that text is readable on the current display. Each choice is associated with a control graphic object such as a radio button. The user selects one of the choices and activates the "OK" button. The user-selected value for a small font is then stored on the local system for future reference by applications. Each user specified size is obtained in a similar manner. For example, similar dialog boxes can be used to define a medium font, large font, touch font, and the like. Each time the user-specified size is stored in a persistent record for future application use.

The same system is applied to icons displayed by the system and other graphic images. Icons of several sizes and colors are stored. The one most appropriate to the current display as selected by the user through a dialog similar to dialog 300 is used. In a particular example, a 64×64×256 color icon may be optimal on a 21-inch color monitor with high resolution, whereas a 16×16××2 color is readable on a PDA.

Figure 4:
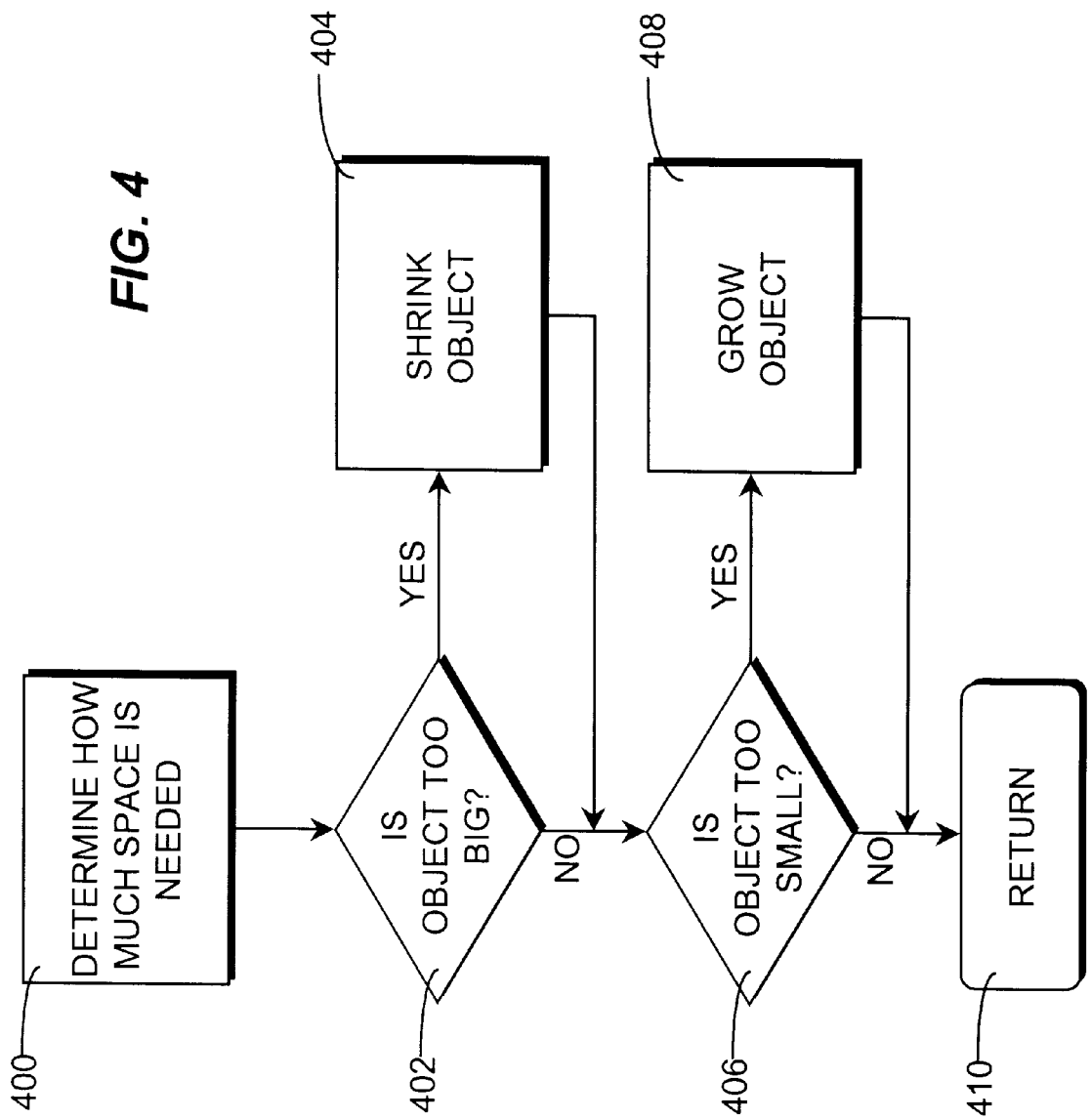
FIG. 4 is a flowchart showing steps in a method for implementing a portion of the present invention.

Dynamic sizing in accordance with the present invention is a process of allowing a graphic component to size itself based upon its content. The flow chart shown in FIG. 4 illustrates primary steps in the process of dynamic sizing in accordance with the present invention. In general, dynamic sizing enables the graphical objects used in a particular window or view to resize themselves on an object-by-object basis. In contrast, prior operation system implemented sizing would resize text and surrounding graphic objects by a predetermined scaling factor that was applied indiscriminately to all graphic objects in a view. Also, prior scaling systems did not account for the size of contained graphic objects (such as text). This resulted in enclosed text running out of the container object (and so not visible) or large containers with only small contained text.

In the prior art, a window graphic object (i.e., the highest level container object) could be sized or automatically adjusted in size based upon its contents. However, this resizing was not available throughout the hierarchy of nested graphic components. In accordance with the present invention, when a larger font size is selected, a button 500, shown in FIG. 5, would grow to hold all of the larger text. Specifying a font size of "small" for the text of a button component will cause the text to be displayed in a small but readable (as described hereinbefore) font size. It will not, however, change the size of the button in prior graphical display devices.

The dynamic sizing feature in accordance with the present invention causes the button object to be aware of the size of the text within it so that it includes methods to adjust its own size in response to the font size. The code example:

```
void FPI_WindowBButtonPush::vSizeNatural(FPI_Size sizeMin, FPI_Size sizeMax)
{
    if ( sizeMax.iW() > 0 )
        sizeMax.vW(sizeMax.iW() - 360);
    if ( sizeMax.iH() > 0 )
        sizeMax.vH(sizeMax.iH() - 180);
    // figure out how much space I need
    FPI_Rect rectNoConstraint(0, 0, 0, 0);
    FPI_Rect  rectNoBreak = rectTextExtent(sGetText(), rectNoConstraint, DT_SINGLELINE);
    int iWidth = rectNoBreak.1W();
    int iHeight = rectNoBreak.iH();
    if ( sizeMax.iW() > 0 )
    {
        // too big?
        if ( rectNoBreak.iW() > sizeMax.iW() )
        {
            FPI_Rect rectConstraint(0, 0, sizeMax.iW(), sizeMax.iH());
            FPI_Rect rectBreak = rectTextExtent(sGetText(), rectConstraint, DT_WORDBREAK);
            if ( rectBreak.iW() > sizeMax.iW() )
                iWidth = sizeMax.iW();
            else
                iWidth = rectBreak.iW();
            iHeight = rectBreak.iH();
            if ( sizeMax.iH() > 0)
            {
                if ( iHeight > sizeMax.iH() )
                    iHeight = sizeMax.iH();
            }
        }
    }
    else
    {
        if ( sizeMax.iH() > 0 )
            if ( iHeight > sizeMax.iH() )
                iHeight = sizeMax.iH();
    }
    // add in space for borders
    iWidth += 360;
    iHeight += 180;
    // am I too small?
    if ( iWidth < sizeMin.iW() )
        iWidth = sizeMin.iW();
    if ( iHeight < sizeMin.iH() )
        iHeight = sizeMin.iH();
    FPI_Size size(iWidth, iHeight);
    vSize(size);
}
``` illustrates a practical example of dynamic sizing in a Windows 95 or Windows NT environment. To implement the step of determining how much space is needed shown in FIG. 4, the particular code example reserves room for borders by subtracting a specified border area from the maximum width and height object of the container object. The sizeMax.iW variable holds the maximum width of the container object whereas the sizsMax.iH variable holds the maximum height object of the container object. In the particular example, the usable area is defined by decreasing sizeMax.iW by 360 TWIPs (i.e., 0.25 inch) and decreasing sizeMax.iH by 180 TWIPS (i.e., 0.124 inch) Any desired dimension may be used, but it is recommended that some border area be defined.

Each of the contained graphic objects are examined in turn. In the case of text, the contained object will be presented in the user-specified unit independent size (e.g., a small font, a large font, or another user-specified size). This user-specified size is the touchstone as the graphic display method and system in accordance with the present invention operates to prevent resizing of these user-specified sizes. Instead, the container object is grown (or shrunk) to fit the user-specified graphic size.

Each contained text item will have an extent indicating the number of characters in the object. Each character will require a user-specified size unit (described above) of width to display properly. The user-specified size will also determine the height of each text line. In the particular code example above, it is determined whether the container object is too big for the contained text in step 402, in which case the container object is resized in the shrink object step 404. It is also determined whether the container object is too small to display the contained text in step 406, in which case the container object is resized during grow object step 408. Once the self-sizing operations shown in FIG. 4 are complete in step 410, the new object data describing the new object dimensions are returned to the dynamic layout program described below.

Figure 5:
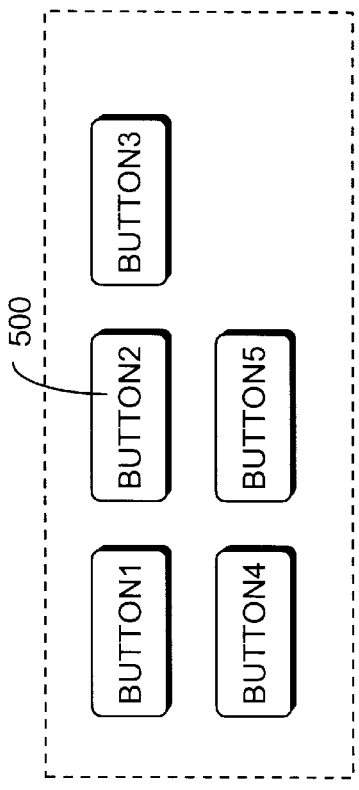
FIG. 5 illustrates a group of graphic objects before processing in accordance with the present invention.
Figure 7:
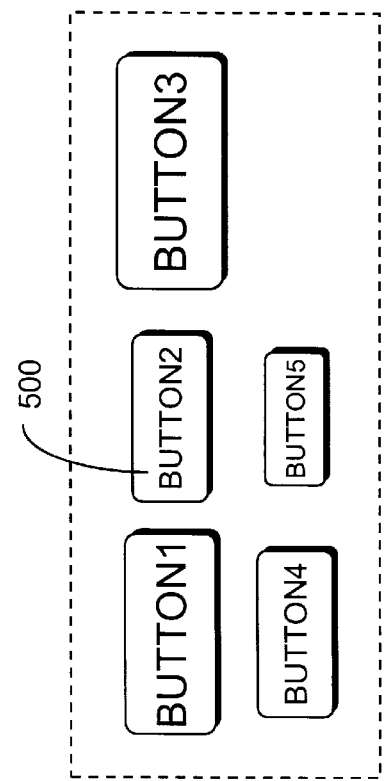
FIG. 7 shows the graphic objects of FIG. 5 after processing in accordance with the present invention.

A comparison of FIG. 5 and FIG. 7 shown the effect of dynamic sizing. In FIG. 5 each button 500 (labeled BUTTON1–BUTTON5) includes data describing whether the contained text should be displayed in a small (e.g., BUTTON %), medium (e.g., BUTTON 2 and BUTTON 4), large (e.g., BUTTON1), or touch (e.g., BUTTON3) size. During dynamic sizing, the text size is converted to the user-specified real dimensions, and container objects 500 grow and shrink as shown in FIG. 7 to properly contain the text. Significantly, this resizing is done at application run time as the text definition stored in an application program only specifies the small, medium, large, and touch sizes, but the application has no a priori knowledge of how the user has specified those sizes for a particular display. Hence, the user-specified sizes, which are saved on the user's computer, are accessed at run time. If the font should be made larger, the button can automatically respond by expanding to accommodate it. This feature in accordance with the present invention ensures that each component will occupy as much display area as it requires but no more. In this manner, the application program does not need to be altered or customized for a particular display in order to display legible graphic objects.

The dynamic layout component in accordance with the present invention is the adjustment of the relative position between components based upon the amount of display area available. Dynamic layout gives the application, not the operating system, control over the final layout and presentation of information to the user. Dynamic layout uses the above identified features (real unit dimensions, unit independent sizing, and dynamic sizing) to enable the application to control the presentation of information to the user on a graphic object-by-graphic object basis without changing the sizing and spacing of the entire graphical interface.

There are two aspects of the dynamic layout feature: 1) layout based on information content of the components, and 2) layout based on component size. Layout based on content is the addition or removal of graphic components based upon the information (i.e., content) being displayed. In one example, each graphic object is given a rank or priority. Once self-sizing graphic objects are dynamically resized, the dynamic layout component checks to determine if all of the components can fit in the available window area (or within the area of the associated container graphical object). If sufficient area exists, layout can be performed in a conventional manner using layout rules stored in the dynamic layout component. These layout rules specify the relative position, alignment, and spacing of each graphical object in a window. However, if insufficient area exists, the dynamic layout component can remove low priority graphical components so that the higher priority components are displayed properly.

Similarly, new graphical objects can be added that serve a similar function to the removed low-priority objects. In a sense, these added graphical objects substitute for the removed objects. These added graphical objects are, for example, smaller and pose fewer restrictions on the dynamic layout component that the original object. In a simple example, a button originally containing the text "CLICK TO CONTINUE" can be replaced by a button containing the text "OK" which requires smaller display area to correctly display. Similarly, an icon graphic that requires significant area to be readable may be replaced by a text graphic or simpler graphic using fewer colors and less detail. In this manner, a the dynamic layout component can construct a view at run time that conveys the required information to the best of the display's capability that meets the sizing required by the user-specified sizes.

Layout based on size is the repositioning of display components based upon their changing size. In a conventional system, the layout of a display (i.e., the positioning of graphical components within a window) is determined by a programmer and fixed until changed by another programmer. In contrast, the system in accordance with the present invention positions graphic display components dynamically (i.e., at run time) based upon the amount of display area available, the size of the components, the desired inter-component spacing, number of rows and columns specified, and similar parameters.

Figure 6:
FIG. 6 shows an example window having real unit dimensions in accordance with the present invention.
Figure 8:
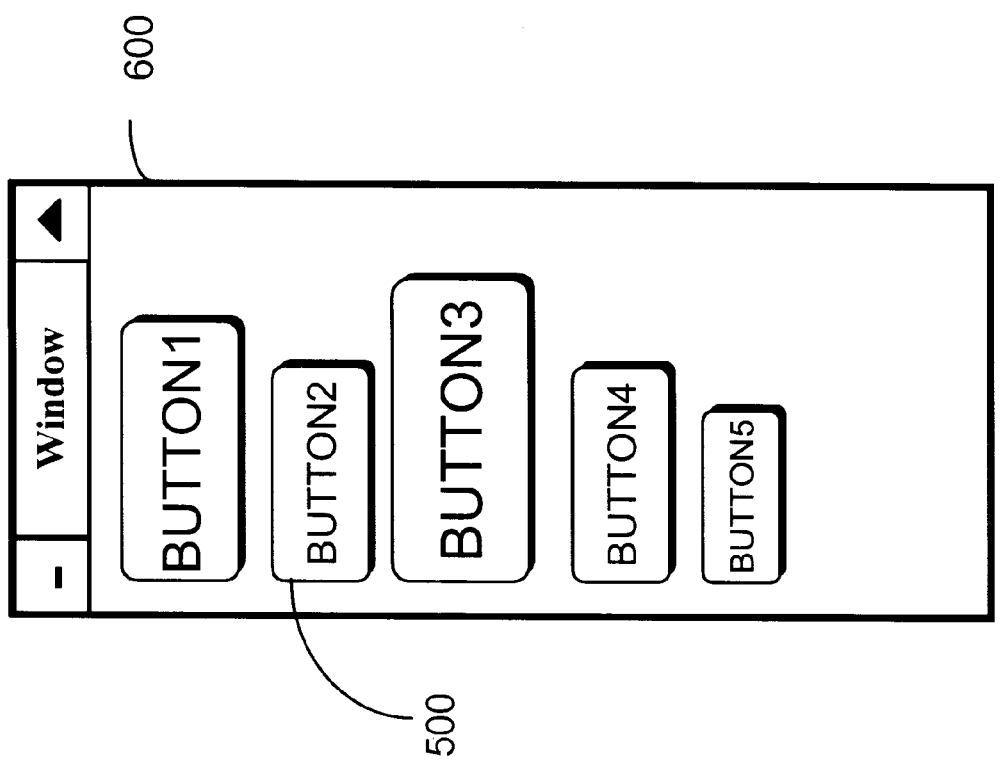
FIG. 8 illustrates a composite graphic view created from a combination of the window shown in FIG. 6 with the graphic elements shown in FIG. 5.
Figure 9:
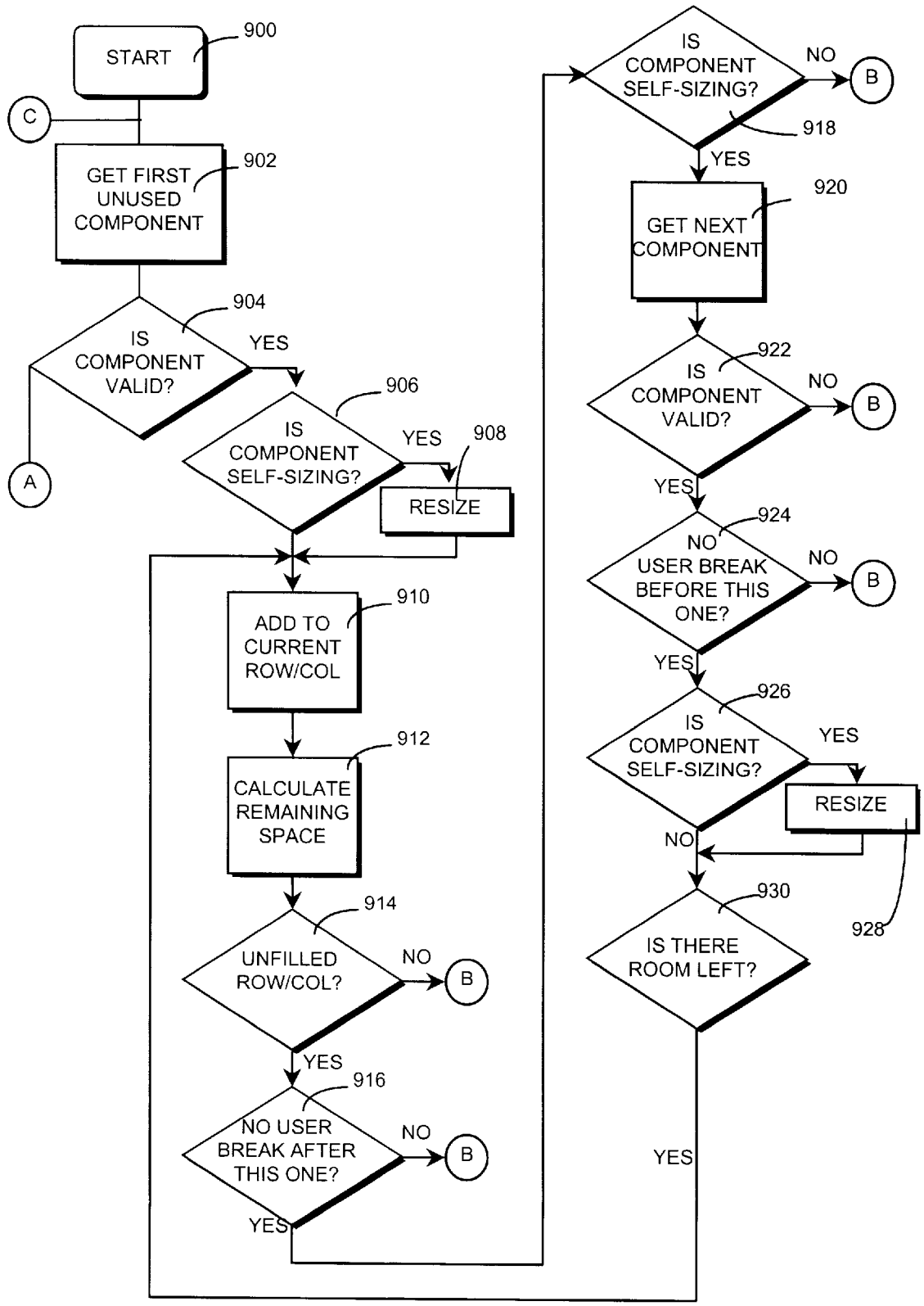
FIG. 9–FIG. 11 show in flow diagram form basic steps in accordance with the method of the present invention.
Figure 10:
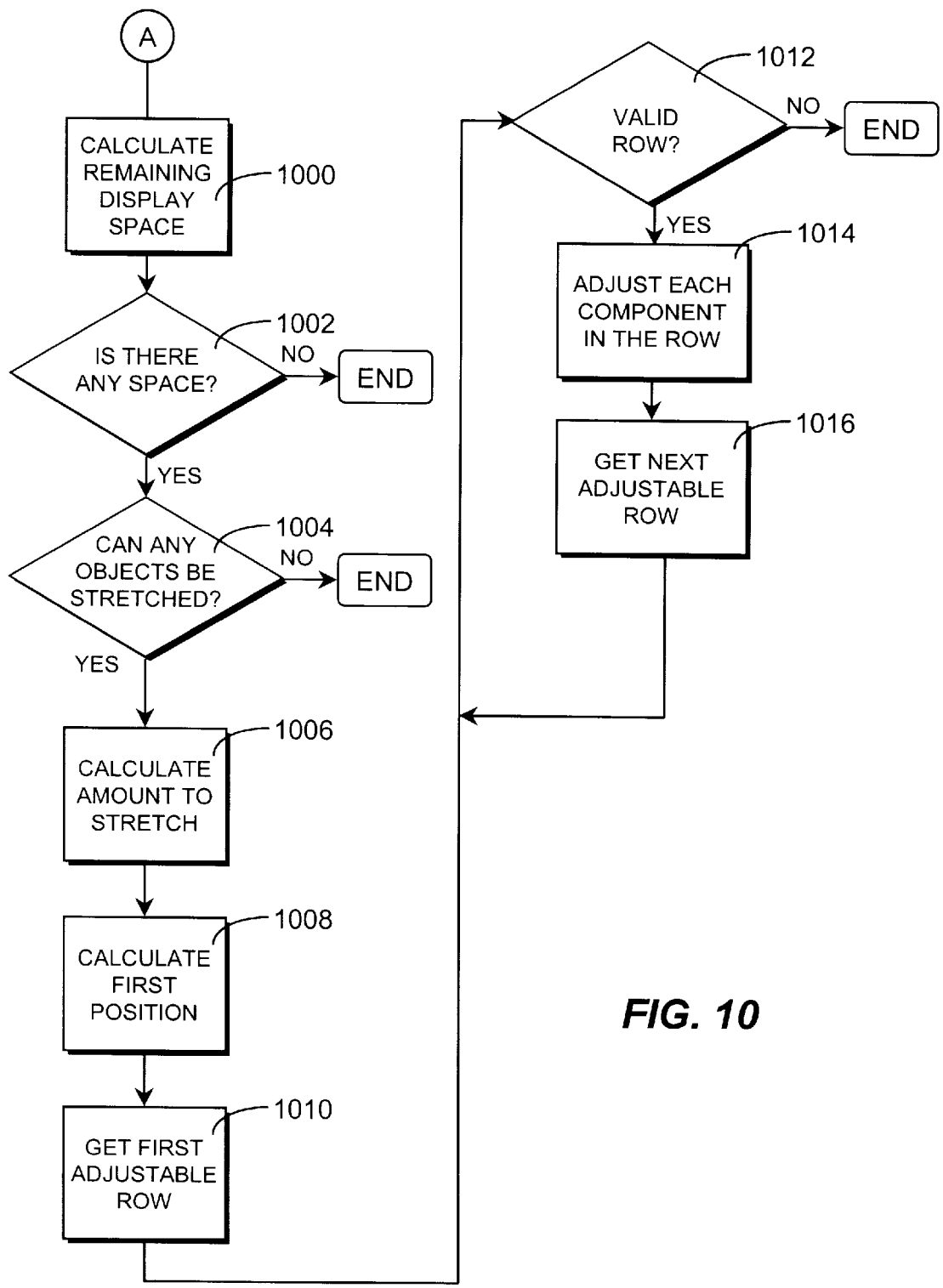
Figure 11:
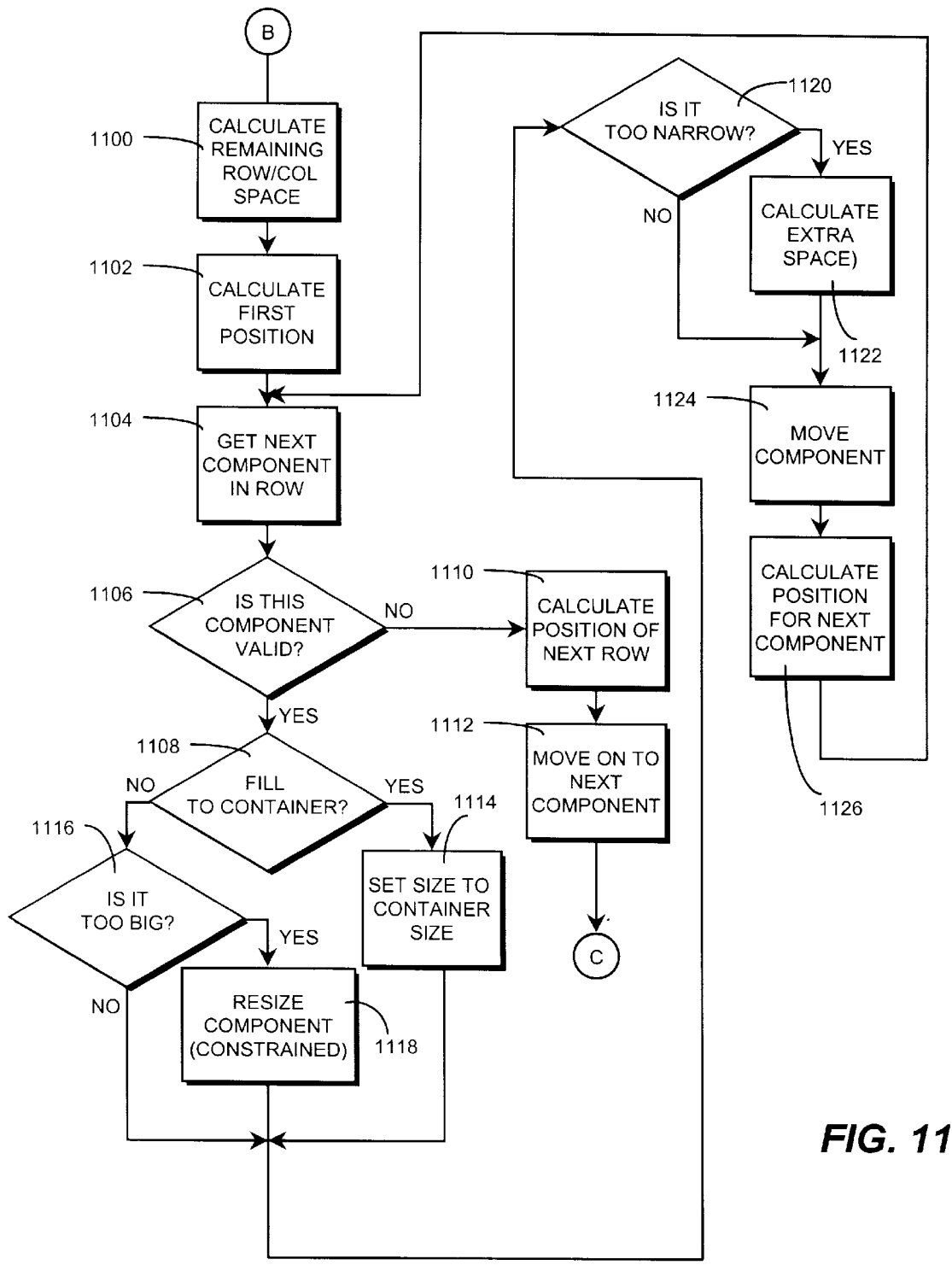

The dynamic layout feature is illustrated by the view construction shown in FIG. 5 through FIG. 8, and the process steps shown and described in the flow charts of FIG. 9 through FIG. 11. Window 600 shown in FIG. 6 is specified with real measurement units (e.g., TWIPs) and so will display at substantially the same size on all display devices. The view is constructed by placing graphic objects 500 inside container 600 as shown in FIG. 8. In conventional windowing systems, the size of each graphic object is coded into the application and so the positions can be specified exactly in a window before runtime. In contrast, the present invention can specify relative positions and spacing between components in the application, but cannot place each graphic object 500 until runtime because the size of each graphic object 500 is not know.

The dynamic layout process in accordance with the present invention begins at start block 900 shown in FIG. 9.

Each view comprises a number of components that are hierarchically ordered. Some objects are container objects, some objects are contained objects, and some objects are both container and contained objects. When objects are placed or laid out in the view, they are marked as used. In step 902, a first unused component is retrieved. In step 904, it is determined whether the retrieved component is valid. A valid component is one that can be placed in the view. If the component is not valid, an error handling routine indicated by the encircled A is begun. For valid components, it is determined whether the component is self-sizing (i.e., dynamically resizeable) in step 906. Where the component is self-sizing, the program control enters step 908 where the resizeable component is resized. The steps in resized step 908 are substantially equivalent to those described in reference to FIG. 4 hereinbefore.

If the component is not self-sizing, or once the component is resized, control flows to step 910 where the component is added to the current row or column. Space remaining in the row or column is calculated in step 912 by subtracting the space used by the added component from the prior remaining space available value. If the current row or column is unfilled as determined in step 914, the program code determines if there is a user break after the current object in step 916. In step 914 if it is determined that the current row or column is not unfilled (i.e., is filled), flow control passes to routine B shown in FIG. 9. Similarly, if there is a user break after this component as determined in step 916, flow control passes to the program steps shown in FIG. 9. When there is not a user break after the current component, the program once again determines if the current component is self-sizing in step 918. This information could be remembered and stored in a state variable from step 906 if desired. If the component is not self-sizing, control flows to process B shown in FIG. 11. Where the component is self-sizing in step 918, the next component is retrieved in step 920.

At this stage it has been determined that the first component that was retrieved can be placed and has been placed in a current row or column. Because the component is self-sizing as determined in steps 906 and 918, the method can continue to get and place the next component in the view. In step 922, it is determined whether the new component is valid which if it is not flow control passes to steps B shown in FIG. 11. If the component is valid, at step 924 it is determined whether there is a user break before this component. Like step 916, step 924 determines whether the new component should be placed in a new line as specified by the user or application. If there is no user break, flow passes to step 926 to determine if the new component is self-sizing. If there is a user break (i.e., a no answer to the query of step 924), flow control passes to process B shown in FIG. 11. Where the new component is self-sizing, it is resized in step 928, using substantially similar process to that described in FIG. 4. In either case, flow control passes to step 930 where it is determined whether there is any room left in the view. If there is room left in the view (i.e., the container object), flow control passes as shown at FIG. 9 to step 910 where the new component is added to the view. The steps are repeated until there are no unused components remaining.

In FIG. 10, when flow control passes to process A, it means that the next unused object that was obtained in step 902 was invalid and that there are no more objects to place. In step 1000, the remaining display space is calculated by subtracting the space used by placed components from the total available. If there is no space left as determined in step 1002, the dynamic layout process can end. If there is space left, in step 1004 it is determined whether any of the contained objects can be stretched to fill the space. If not, the dynamically out process is ended. If yes, in step 1006 it is calculated how much this stretch is required to fill the unused space. In step 1008, a first position is calculated and in step 1010 the first adjustable row is retrieved. If the row is valid as determined in step 1012, the process flow continues to adjust each component in the row in step 1014 and get the next adjustable row in step 1016. Steps 1014 and 1016 are repeated until an invalid row occurs indicating that no more adjustable rows exist. When this occurs, the dynamic layout process is ended as shown by element 1012 in FIG. 10.

FIG. 11 illustrates major process steps in a process B that is entered whenever a row is filled and a new row is to begin in the layout process. In step 1100, the program calculates the remaining row and column space in the container object. A first position is calculated in step 1102 and the next component in that row is retrieved in step 1104. If the retrieved component is valid, as determined in step 1106, flow continues as shown in FIG. 11. If the component is not valid, meaning that it is not in fact a component and that all components have been processed, flow passes to steps 1110 where the position of the next row is calculated and step 1112 where the process moves on to select the next component and returns to the flow shown in FIG. 9 at entry point designated C.

When the component is valid, in step 1108 the program determines whether the component should be sized to fill the container. If yes, the component size is set equal to the container size in step 1114. If no in step 1108, it is determined whether the graphic object is too big in step 1116 to fit in the container. If the object is too big, it is resized in step 1118 which is analogous to the shrink step 404 shown in FIG. 4. Once resized if necessary, it is determined if the object is too narrow in step 1120. If the object is too narrow, the extra space required is calculated in step 1122 and flow passes on to the move component step 1124. Once the component is moved to its new position, the position for the next component is calculated in step 1126. After which, the next component in the row is retrieved in step 1104. The process steps loop as indicated until the get next component step retrieves an invalid component as determined in 1106.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for operating a graphic user interface in a windowing operating system comprising the steps of:

determining from information stored in the operating system a value representing a mapping of logical inches to real measurement units;

determining from information stored in the operating system a physical size in real measurement units of a display device used to display the graphic user interface;

asking a user viewing the display device to identify a displayed graphic image having a preselected dimension in real measurement units;

displaying a plurality of graphic objects, wherein each of the graphic objects have a different size;

asking the user viewing the plurality of graphic object to select one of the graphic objects;

storing the size of the selected graphic object as a first user-defined size.

2. The method of claim 1 further comprising the steps of:

displaying a plurality of graphic objects, wherein each of the graphic objects have a different size;

asking the user viewing the plurality of graphic object to select one of the graphic objects; and storing the size of the selected graphic object as a second user-defined size.

3. The method of claim 1 further comprising the steps of:

storing the value representing a mapping of logical inches to real measurement units, the physical size in real measurement units of the display device, and a value representing the first user-defined size in persistent storage.

* * * * *